Patented Apr. 7, 1953

2,634,245

UNITED STATES PATENT OFFICE 2,634,245

WATER DISPERSIBLE ALKYD TYPE RESINS

Rudolph P. Arndt, Milwaukee, Wis., assignor to Pittsburgh Plate Glass Company, Allegheny County, Pa., a corporation of Pennsylvania No Drawing. Application April 27, 1950, Serial No. 158,611

15 Claims. (Cl. 260—22)

The present invention relates to the provision of water dispersible coating compositions and it has particular relation to the provision of such compositions from oil modified alkyd resins.

One object of the invention is to provide a water dispersible alkyd resin which can be thinned with hard or soft water to any desired degree of dilution.

A second object of the invention is to provide an alkyd resin composition of water dispersible character which, when spread as a film, will dry quickly to a hard non-tacky state.

A third object of the invention is to provide a water dispersible oil modified alkyd resin base which when dispersed in water, spread as a film and dried, will withstand washing and cleaning with water with but little or no tendency to dissolve or redisperse.

A fourth object is to provide a water dispersible alkyd resin which when dispersed in water to form coating compositions can be readily washed from the brush employed as a spreading device.

A fifth object of the invention is to provide water dispersions of an alkyd resin which will withstand storage in containers or exposure to a humid atmosphere after application without spoilage from molds or other microscopic organisms of decomposition.

A sixth object of the invention is to provide a water dispersion of an alkyd type resin which can be subjected to freezing without deterioration.

A seventh object of the invention is to provide a water dispersion of an alkyd resin which can be stored or incorporated with so-called driers, pigments and other materials without inversion of phases or loss of stability.

An eighth object of the invention is to provide emulsion of alkyd resins in water which has good odor characteristics.

A ninth object of the invention is to provide a water dispersion of an alkyd resin which possesses good flow and leveling properties.

A tenth object of the invention is to provide a water dispersion of an alkyd resin which can be stored in conventional metal containers with but little or no rusting of the containers.

These and other objects of the invention will be apparent from the consideration of the following specification and the appended claims.

It is customary to provide alkyd resins which are polyesters of a dicarboxylic acid such as phthalic acid and a polyhydric alcohol such as glycerol and/or pentaerythritol. For purposes of improving the solubility and compatibility characteristics of these compositions, it is also common practice to include in the polyesters a drying oil acid component. Drying oils of acids which could be so included comprise linseed oil, soybean oil, fish oil, tung oil, china-wood oil, oiticica oil and many other oils as well as mixtures of these and other oils. The resultant products commonly have been incorporated with solvents such as xylol, toluene and various other solvent media in order to form compositions of sufficient fluidity for spreading by brush, spraying, roller or other conventional methods of application. The solvent media, of themselves, have been relatively expensive and since they evaporate after the application of the film they have been lost in the finished product. Also the solvents in many cases have presented problems of inflammability and have been of objectionable odor.

It has also been proposed to incorporate alkyd resins with dispersing agents, such as casein or soaps, in order to provide compositions which were adapted for dispersion in water to attain fluidity without addition of organic solvents. However, most of the dispersing agents as heretofore proposed for use in alkyd resins have been objectionable for various reasons. For example, they were subject to attack by molds or bacteria during periods of storage or during periods of high humidity after application. Also, the compositions in many instances after application and drying upon a surface, were subject to redispersion and removal even in the normal washing or cleaning of the surface to which the compositions were applied. Many other objectionable characteristics were also encountered in connection with the compositions as heretofore prepared.

The present invention contemplates the provision of a water dispersible alkyd resin which is substantially free from the foregoing defects as well as many other defects which have heretofore been encountered in connection with water dispersions of alkyd resins. It is based upon the use of polyethylene glycols as modifiers of alkyd resins and particularly of alkyd resins containing a drying oil component. The resins, when properly modified, are readily dispersible in water to form coating compositions of excellent characteristics.

THE ALKYD RESIN BASE

The preparation of alkyd resin components, and especially of alkyd resins modified with a drying oil suitable for use in the practice of the invention, is a conventional practice and they are readily obtainable as commercial products on the market. The applicant may employ these commercial materials to provide the alkyd resin component of the improved product. For these reasons, it is not deemed necessary to discuss in detail the formulation and preparation of the alkyd resin base. It is sufficient to say that normally, they are prepared by heating phthalic anhydride and glycerol, together with a drying oil derivative modified by ester interchange with glycerol in order to form the monoglycerides or the diglycerides of fatty acids. In some instances "oil modification" is effected by first reacting the free fatty acids of a glyceride oil, notably a drying oil, with glycerol to form mono- or diglycerides or mixtures thereof. These partial esters may then be incorporated with phthalic acid and glycerol (if required) and the mixture can be heated to form a polyester product. It is further contemplated that oil modified resins can be obtained by incorporation of the fatty acids and glycerin with phthalic acid and heating the mixture to reaction temperature. Normally the polyesters will contain 30 to 60% and preferably 45 to 55% by weight or slightly more or less of the glyceride oil or its equivalent of mono- or diglyceride. Such resins are spoken of as being 30 to 60 or 45 to 55% oil modified. The total glycerol component of the mixture normally should be in approximate molecular equivalency of the carboxyls of the phthalic anhydride and the fatty acids of the drying oil. In some instances, glycerol may be partially or completely replaced by pentaerythritol.

Preferably the alkyd resin components are heated until water is evolved by condensation reaction and is separated from the reaction zone. The reaction is continued until fairly high viscosity is attained; for example, approximately W to Z or above, when the resin is diluted with 50% by weight of naphtha. In any event heating should not be continued so long as to form an insoluble, infusible product.

THE POLYETHYLENE GLYCOL COMPONENTS

The polyethylene glycol component which is employed as a modifier of the alkyd resin base, preferably, is a condensation product of ethylene glycol of relatively high average molecular weight. Usually it includes a plurality of ether linkages. It is believed that in most instances this average molecular weight of the polyethylene glycol will be above 300 and it will extend to and above 1500 or 2000. Very satisfactory results have been obtained by use of polyethylene glycols of average molecular weights within a range of 300 to approximately 1500. It is to be understood that mixtures of polyethylene glycols of high molecular weight, for example, approximately 1500, and low molecular weight, approximately 300 or 1000, are contemplated as being within the spirit of the invention.

Appropriate polyethylene glycols are sold commercially under the trade name of "Carbowaxes." Normally these are further designated by numbers which in many instances approximate the molecular weight of the particular "Carbowax." "Carbowax" 1540, for example, is understood to be of an average molecular weight of 1300 to 1600.

PROPORTION OF REACTANTS

In the preparation of water dispersible alkyd resin bases in accordance with the provisions of this invention, substantial variations in the proportion of the alkyd resin base and the polyethylene glycol are contemplated. More satisfactory results appear to be obtained by employment of the polyethylene glycol in a proportion of approximately 15 to 25% by weight of the combination of alkyd resin and polyethylene glycol. However, the applicant considers that somewhat higher and somewhat lower proportions are contemplated within the scope of the invention. For example, proportions as low as 10% or as high as 30% by weight may under some conditions be operable within the spirit of the invention.

CONDITIONS OF REACTION

In the preparation of the water dispersible polyethylene glycol modified alkyds, it is desirable that the alkyd resin be preliminarily heated to a temperature which usually will be about 200° C. and is most instances will be below 300° C. Good results have been obtained by preliminarily heating the mixture to 220 or 235° C. The polyethylene glycol, preferably, is also heated to a temperature within the foregoing range and is then added to the preheated alkyd resin base. The mixture should be maintained at the foregoing temperature until the polyethylene glycol goes into solution. It is believed that esterification between residual free carboxyls and the hydroxyls of the polyethylene glycol occur. As the heating operation is continued, it will be found that, in many cases, the viscosity of the solution will tend to fall. Heating may be continued until the minimum of viscosity, as determined upon small samples of the reaction product, is reached and the viscosity begins to rise. Obviously, heating should be discontinued before the tendency of the mixture to gel becomes pronounced. The attainment of a satisfactory degree of reaction between the alkyd resin and the polyethylene glycol may be determined by conducting tests of the dispersibility of the alkyd resins in water upon small samples drawn off from time to time from the reaction mixture.

The reaction product if properly made, should be readily dispersible by mere agitation in water (hard or soft) without the addition of dispersing agents such as casein or soaps. The resultant emulsion should be of the oil in water type, that is, the water should constitute the continuous phase.

It is impracticable to set definite time limits upon the reaction because such limits vary with the different polyethylene glycols, the different alkyd resin bases and also different proportion of the polyethylene glycol. In general, the higher the proportion of polyethylene glycol in the reaction mixture, the shorter will be the time required for completion of the reaction. With proportions of polyethylene glycol of approximately 24% weight, the time for completion of reaction may be only 30 or 40 minutes. On the other hand, if the proporiton of polyethylene glycol is lower, the reaction period may be extended to several (e. g. 4 or 5) hours.

Usually the reaction pressure will be at or near atmospheric, however superatmospheric pressures are not precluded.

A somewhat generalized summary of proportions of reactions and of conditions involved in the preparation of a water dispersible alkyd resin in accordance with the provisions of the present invention may be tabulated as follows:

Alkyd resin (30–60% oil modified), 70–90% by weight
Polyethylene glycol, 10–30% by weight
Temperature of reaction, 200–300° C.
Time of reaction preferably determined by dispersion or viscosity tests.

The following constitute examples illustrating the application of the principles of the invention.

*Example I*

An alkyd resin was prepared from the following ingredients:

| | Parts by weight |
|---|---|
| Soybean oil | 1040 |
| Tung oil | 520 |
| Glycerol | 525 |
| Catalyst, e. g. litharge | 9 |
| Phthalic anhydride | 1130 |
| Xylene | 166 |

These ingredients were reacted in an appropriate reactor for alkyd resins, under an inert atmosphere, also under a reflux condenser and at the usual temperature for the preparation of alkyd resins. Reaction was continued until a resin product of a body of $Z_3$ at a concentration of 50% by weight in petroleum naphtha boiling at 310 to 410° F. was obtained.

In order to impart water dispersibility to this alkyd product, it was brought to a temperature of 220° C. and 809 parts by weight of a mixture of polyethylene glycol, which was a combination of equal parts of polyethylene glycol of an average molecular weight of 1450 and a polyethylene glycol of an average molecular weight of 300, similarly heated, was added. The temperature was maintained for 80 minutes with agitation. At the conclusion of this period the mixture was cooled as rapidly as feasible.

The resultant product could be readily dispersed by agitation in water at a temperature of 100° C. or below. The resultant dispersions were of the oil in water type. That is, the water constituted the continuous phase. The dispersions were stable and suitable for spreading out to provide quick drying films.

*Example II*

In this example, a naphtha soluble alkyd resin, which was modified with 50.8% by weight of linseed oil and which otherwise comprised glycerol and phthalic anhydride, was prepared as previously described. In the preparation, 5% by weight of xylene was included in the reaction mixture as a refluxing medium. The resultant resin at 220° C. was admixed with polyethylene glycol, sold commercially as Carbowax 1500 W. The latter, as above described, comprises equal parts of polyethylene glycol of 1450 average molecular weight and 300 average molecular weight. The proportions of the reactants were:

400 parts by weight of resin
100 parts by weight of polyethylene glycol mixture

The mixture of alkyd resin and polyethylene glycols was held at a temperature of 220° C. for 155 minutes, at the end of which time all of the reactants had been completely dissolved. The mixture was quickly cooled. The mixture, like that already described, was readily dispersible in water in practically any proportion to provide coating compositions that leveled well and dried rapidly.

*Example III*

According to this example, 480 parts by weight of an oil modified alkyd resin (46.7% of linseed oil) was prepared. The product was admixed with 100 parts by weight of Carbowax 1000 (polyethylene glycol of average molecular weight of 1000). The admixture of the ingredients was effected at 220° C. and this temperature was maintained for two hours. The reactants went into solution in the manner described in the foregoing examples. The product when cooled below 100° C. could be dispersed by agitation in water to provide a coating composition of good leveling and drying characteristics.

FORMULATIONS OF COATING COMPOSITIONS

The modified alkyd resins above described can be formulated with siccatives used as catalysts of air drying in drying oils. There are a large number of such driers available to the paint industry. These include drying oils soluble resinates, naphthenates, and fatty acid salts of various drier metals such as cobalt, lead, chromium, nickel or the like. Details of preparation of the driers does not constitute a feature of the present invention. They may be purchased as standard products. The driers are designed to promote or accelerate the air drying of the films of modified resins prepared as above described. The use of such driers is not in all instances required since the films will gradually dry without them. However in a commercial product, they are to be preferred.

The driers may be employed in various proportions, for example, .1 to 5% of active metal. The incorporation of the drier is promoted if it is preliminarily dissolved in an appropriate solvent such as naphtha or the like.

It is to be understood that the compositions may be employed in an unpigmented state if desired. However in most cases pigments are to be preferred. These include the usual pigments of the paint industry, such as titanium dioxide or modifications thereof, finely pulverized silica, finely pulverized calcium carbonate, such as chemically precipitated calcium carbonate, china clay, lithopone and many others. The pigments are chemically inert with respect to the resins and may be employed in the usual amounts to provide color or hiding power in the films formed from the resins.

If the dispersible resins before or after the incorporation of water are to be stored in conventional sheet iron containers such as conventional tin cans for substantial periods of time, it is desirable to inhibit corrosion of the metal. This may conveniently be accomplished by the addition of a volatile base such as ammonium hydroxide or morpholine. Other volatile amines, of course, could be employed. If the compositions are to be used promptly after preparation, or if the compositions are to be stored in wooden containers or other containers which are relatively resistant to corrosion, the use of a volatile base is not required. Usually volatile bases are added in an amount sufficient to raise the pH value of the composition to a point above that of neutrality. A value of 8 or 9 usually is sufficient. More may be added since it will evaporate when the films are spread.

Normally, the resins modified by polyethylene glycols as above described, are readily dispersible in water without inclusion of dispersing agents.

However, if some of the less readily dispersible materials are to be kept for considerable periods of time before being used, it may be desirable to include a small amount of an additional dispersing agent such as carboxymethyl cellulose.

The following constitute examples illustrating the formulation of coating compositions from the water dispersible modified alkyd resins prepared in accordance with the provisions of Examples I to III inclusive.

Example A

In this example, the modified water dispersible resin prepared in accordance with Example III was employed as a vehicle. The composition was of the following proportions:

| | Parts by weight |
|---|---|
| Resin vehicle (Example III) | 300 |
| Drier (containing 5% of lead and 0.5% of cobalt) | 6 |
| Drier (containing 3.15% by weight of lead and 0.6% by weight of manganese) | 6 |
| Water | 450 |
| Titanium dioxide | 601 |

The mixture could be ground up in a conventional paint mill, such as a Buhr mill or a roller mill, to obtain thorough dispersion of the pigments. It is to be understood that the pigments and driers could be added to the modified alkyd resin before addition of the water or simultaneously with the addition of water. It is also contemplated to mill the pigment into the water dispersion of the modified alkyd resin.

The resultant composition can readily be brushed or spread by any conventional means to provide films which will dry very quickly to a hard coating that will withstand washing even with conventional household detergents for considerable periods of time. The compositions will wash from a brush with water even after standing for considerable periods. It is to be understood that the compositions can be diluted with water (hard or soft) to practically any desired degree. Films of the material level well.

Example B

In this example a modified water dispersible resin was prepared in accordance with the provision of Example II.

The resin was formulated with other film-forming ingredients as follows:

| | Parts by weight |
|---|---|
| Resin vehicle (Example II) | 100 |
| Water | 140 |
| Titanium dioxide | 85 |
| Finely pulverized silica | 15 |
| Finely pulverulent calcium carbonate | 450 |
| Morpholine or ammonium hydroxide | 4 |
| Drier solution comprising 5% lead and .5% cobalt | 5 |

These components were milled together to provide a stable uniform composition that could be stored in cans or similar containers for long periods of time. The dispersion was of the oil in water type. The composition, of course, could be diluted with water to any desired degree and could be washed from the brush with water even after the brush had stood for some time. The composition could be spread as a film upon wood, glass or other surfaces to provide films which dried quickly and which would withstand severe scouring and washing.

Example C

In this example a modified water dispersible resin was prepared in accordance with the technique outlined in Example II. In the preparation of a coating composition the formulation was as follows:

| | Parts by weight |
|---|---|
| Resin vehicle (Example II) | 100 |
| Water | 200 |
| Titanium dioxide | 400 |
| Pulverulent calcium carbonate | 400 |
| Ammonium hydroxide or morpholine | 6 |
| Drier solution comprising 5% lead and .5% cobalt | 5 |

The mixture was milled until a smooth, uniform dispersion was obtained, which was of the oil in water type. The composition had good coating characteristics. The composition could be rinsed from the brush with water.

Example D

In this example water dispersible resin prepared in accordance with the provisions of Example II was employed. The proportions of the ingredients were as follows:

| | Parts by weight |
|---|---|
| Resin vehicle (Example II) | 40 |
| Water | 70 |
| Lithopone | 120 |
| China clay | 60 |
| Titanium dioxide | 20 |
| Base (ammonium hydroxide or morpholine) | 3 |
| Drier solution comprising 5% of lead and .5% of cobalt | 2 |

The mixture was milled until a uniform dispersion suitable for spreading as films was obtained. The films from the dispersion dried quickly, as a result of the evaporation of the water and subsequent air drying of the alkyd resin base contained therein. The dried films would withstand prolonged scouring and washing.

The foregoing examples are merely illustrative of the application of the principles of the invention. It will be apparent to those skilled in the art that numerous modifications may be made therein without departure from the spirit of the invention or the scope of the appended claims.

I claim:

1. In a process of preparing a water dispersible resin, the steps comprising admixing a drying glyceride oil modified glyceryl phthalate resin with polyethylene glycol and heating the mixture until said water dispersible vehicle is obtained.

2. In a process of preparing a water dispersible coating vehicle, the steps of admixing polyethylene glycol and an alkyd resin which is drying glyceride oil modified to the extent of 30 to 60% by weight and heating the mixture until a homogeneous solution is formed.

3. In a process of preparing a water dispersible resin, the steps of admixing a glyceryl phthalate resin which has been modified with a glyceride drying oil to the extent of 30 to 60% by weight adding polyethylene glycol and maintaining the mixture at 200 to 300° C. until a water dispersible product is formed.

4. In a process of forming a water dispersible coating composition of an alkyd resin containing from 30 to 60% by weight of drying oil, the steps of heating the resin to a temperature of above 200° C. and below 300° C., adding polyethylene glycol thereto in an amount of 15 to 25% by weight and at a temperature within said range until after the polyethylene glycol is dissolved, then cooling the mixture.

5. In a process of forming a water dispersible coating from a glyceryl phthalate resin which has been modified to the extent of 30 to 60% by weight with drying glyceride oil, the steps of forming a mixture of said resin and a polyethylene glycol of an average molecular weight above 300 and at a temperature within a range of 200° to 300° C. until the polyethylene glycol passes into solution and the viscosity of the emulsion made from the mixture drops approximately to a minimum as determined by conventional viscosity tests.

6. In a process of forming a resin product capable of dispersing in water to form oil in water emulsions, the steps of admixing 10 to 30% by weight of polyethylene glycol of average molecular weight above 300 with a phthalic glyceride resin which is modified with glycerides of a drying oil acid in an amount to obtain 30 to 60% by weight oil modification of the phthalic glyceride, heating the mixture until the polyethylene glycol dissolves in the phthalic glyceride and said water dispersible product is formed.

7. In a process of forming a water dispersion of a phthalic glyceride resin which is modified with glycerides of drying oil acids in an amount to obtain 30 to 60% by weight oil modification of the phthalic glycerides, the steps of adding polyethylene glycol of a molecular weight above 300 to the phthalic glyceride resin in an amount of 10 to 30% by weight of the total mixture, heating the mixture until the polyethylene glycol goes into solution and a water dispersible product is formed and dispersing said product in water.

8. A resinous body adapted to dispersion in water to form an oil in water type dispersion comprising a reaction product of (A) a glyceryl phthalate containing a glyceride of drying oil acids in an amount to provide 30 to 60% by weight oil modification of the glyceryl phthalate and (B) 10 to 30% by weight of polyethylene glycol of average molecular weight above 300.

9. A resinous body which is adapted to disperse as a discontinuous phase in water, said body comprising a preformed alkyd esterification product of phthalic acid, a polyhydric alcohol and fatty acids of a drying oil, the fatty acids being in proportion to provide 30 to 60% by weight oil modification of the resin, said body further containing chemically reacted with the alkyd esterification product, 10 to 30% by weight of polyethylene glycol of an average molecular weight of 300 to 1500.

10. A coating composition which is a dispersion in water of glyceryl phthalate resin containing glycerides of drying oil fatty acids in an amount to provide 30 to 60% by weight oil modification of the resin, the resin further containing 10 to 30% by weight of polyethylene glycol of an average molecular weight in excess of 300.

11. A resinous body as defined in claim 9 which further contains pigment dispersed therein.

12. A resinous body as defined in claim 9, which further contains .1 to 5% of a soluble compound of a heavy metal which is a catalyst of air drying of the resin.

13. The process of claim 1 wherein the polyethylene glycol has a molecular weight above 300.

14. The water dispersible reaction product of a drying oil modified glyceryl phthalate resin and a polyethylene glycol having a molecular weight of at least 300.

15. A resinous body adapted for dispersion in water to form an oil in water type dispersion, said body comprising a reaction product of (A) a glyceryl phthalate containing a glyceride of drying oil acids, said acids being free of hydroxyl groups, and being present in an amount to provide 30 to 60% by weight oil modification of the glyceryl phthalate, and (B) 10 to 30% by weight of polyethylene glycol of average molecular weight above 300.

RUDOLPH P. ARNDT.

REFERENCES CITED

The following references are of record in the file of this patent:

UNITED STATES PATENTS

| Number | Name | Date |
| --- | --- | --- |
| 2,446,581 | Gold et al. | Aug. 10, 1948 |
| 2,505,824 | De Groote et al. | May 2, 1950 |
| 2,505,825 | De Groote et al. | May 2, 1950 |
| 2,568,747 | Kirkpatrick et al. | Sept. 25, 1951 |